United States Patent
Chen

(10) Patent No.: US 11,067,429 B2
(45) Date of Patent: Jul. 20, 2021

(54) LIQUID LEVEL DETECTION DEVICE

(71) Applicant: HOKWANG INDUSTRIES CO., LTD., New Taipei (TW)

(72) Inventor: Kuan-Jen Chen, New Taipei (TW)

(73) Assignee: HOKWANG INDUSTRIES CO., LTD., New Taipei (TW)

( * ) Notice: Subject to any disclaimer, the term of this patent is extended or adjusted under 35 U.S.C. 154(b) by 151 days.

(21) Appl. No.: 16/289,931

(22) Filed: Mar. 1, 2019

(65) Prior Publication Data

US 2020/0278236 A1 Sep. 3, 2020

(51) Int. Cl.
| | |
|---|---|
| *G01F 23/36* | (2006.01) |
| *G01F 23/76* | (2006.01) |
| *G01F 23/60* | (2006.01) |
| *G01F 23/00* | (2006.01) |

(52) U.S. Cl.
CPC ........ *G01F 23/363* (2013.01); *G01F 23/0046* (2013.01); *G01F 23/603* (2013.01); *G01F 23/76* (2013.01)

(58) Field of Classification Search
CPC ...... G01F 23/363; G01F 23/76; G01F 23/603; G01F 23/0046
See application file for complete search history.

(56) References Cited

U.S. PATENT DOCUMENTS

| | | | |
|---|---|---|---|
| 3,297,844 A * | 1/1967 | Eisendrath | A47J 31/56 200/84 R |
| 6,870,110 B2 | 3/2005 | Sorbo et al. | |
| 2004/0233063 A1* | 11/2004 | Sorbo | H01H 35/18 340/623 |
| 2008/0245146 A1* | 10/2008 | Chen | G01F 23/363 73/317 |
| 2019/0120683 A1* | 4/2019 | Shiota | G01F 23/42 |

* cited by examiner

*Primary Examiner* — Xin Y Zhong
(74) *Attorney, Agent, or Firm* — Muncy, Geissler, Olds & Lowe, P.C.

(57) ABSTRACT

A liquid level detection device is disposed in a container having a viscous liquid. The liquid level detection device includes an installing seat, a connecting rod, a pivoting structure connecting the installing seat and one end of the connecting rod, and a floating element disposed at one end of the connecting rod opposite to the installing seat. Further, the liquid level detection device includes a protecting bladder disposed to correspond to the pivoting structure. The protecting bladder divides the liquid level detection device into a coated part and an exposed part. One end of the floating element opposite to the installing seat is the exposed part. The protecting bladder isolates the viscous liquid from contacting with the pivoting structure to prevent excessive viscous liquid from remaining on the pivoting structure and avoid the problem of misoperation of the liquid level detection device caused by the influence of the protecting bladder.

9 Claims, 5 Drawing Sheets

LIQUID LEVEL DETECTION DEVICE

FIELD OF THE INVENTION

The present invention relates to a liquid level detection device, in particular to a liquid level detection device provided with a protecting bladder.

BACKGROUND OF THE INVENTION

At present, a float level switch is generally used to detect the level height of water or other non-viscous liquids. However, if the float level switch is used to detect the level of a viscous liquid (such as liquid soap), the viscous liquid that remains on the float level switch will agglomerate after multiple changes in the liquid level. Once the above agglomeration occurs at a pivoting position of the float level switch, the agglomeration may prevent the float level switch from changing with the current liquid level, causing that the float level switch operates in error and consequently fails.

For example, U.S. Pat. No. 6,870,110B discloses a float switch with a protecting sleeve. The protecting sleeve completely wraps the float switch to prevent the direct contact between the float switch and the liquid. However, the protecting sleeve will be subjected to liquid buoyancy, which results in misoperation of the float switch.

SUMMARY OF THE INVENTION

The main purpose of the present invention is to solve the problem that a protecting structure used in the existing liquid level detection device easily causes misoperation of the liquid level detection device.

To achieve the above purpose, the present invention provides a liquid level detection device disposed in a container comprising a viscous liquid. The liquid level detection device includes an installing seat disposed on the container, a connecting rod, a pivoting structure connected with the installing seat and one end of the connecting rod, and a floating element disposed at one end of the connecting rod opposite to the installing seat. Further, the liquid level detection device includes a protecting bladder disposed to correspond to the pivoting structure. The protecting bladder divides the liquid level detection device into a coated part and an exposed part. One end of the floating element opposite to the installing seat is the exposed part. The protecting bladder isolates the viscous liquid from contacting with the pivoting structure.

In an embodiment, the protecting bladder includes a connecting portion clamped by the installing seat and the container, a coating portion extending from the connecting portion and coating at least the pivoting structure, and a liquid intake limiting portion connected with the coating portion and fitting to the floating element.

In an embodiment, the protecting bladder is flexible.

In an embodiment, the protecting bladder is composed of a plurality of bladder slices.

In an embodiment, the protecting bladder includes a connecting portion sleeved on the installing seat, a coating portion extending from the connecting portion and coating at least the pivoting structure, and a liquid intake limiting portion connected with the coating portion and fitting to the floating element.

In an embodiment, the pivoting structure includes at least one convex block disposed on a limiting rod, and an assembly hole disposed on the connecting rod to correspond to the convex block.

As previously described in the present invention, compared with the prior art, the present invention comprises the following characteristics: the protecting bladder of the present invention prevents the viscous liquid from contacting a pivot structure so as to solve the problem that the pivot structure cannot operate normally due to the viscous liquid that remains on the pivot structure. In another aspect, the protecting bladder does not completely coat the liquid level detection device, so that the exposed part is used as a liquid level detection point by the liquid level detection device, thereby solving the problem of inaccurate detection or misoperation of the liquid level detection device due to the protecting bladder

DETAILED DESCRIPTION OF THE PREFERRED EMBODIMENTS

The details and technical contents of the present invention will be described below with reference to drawings.

Figure 1:
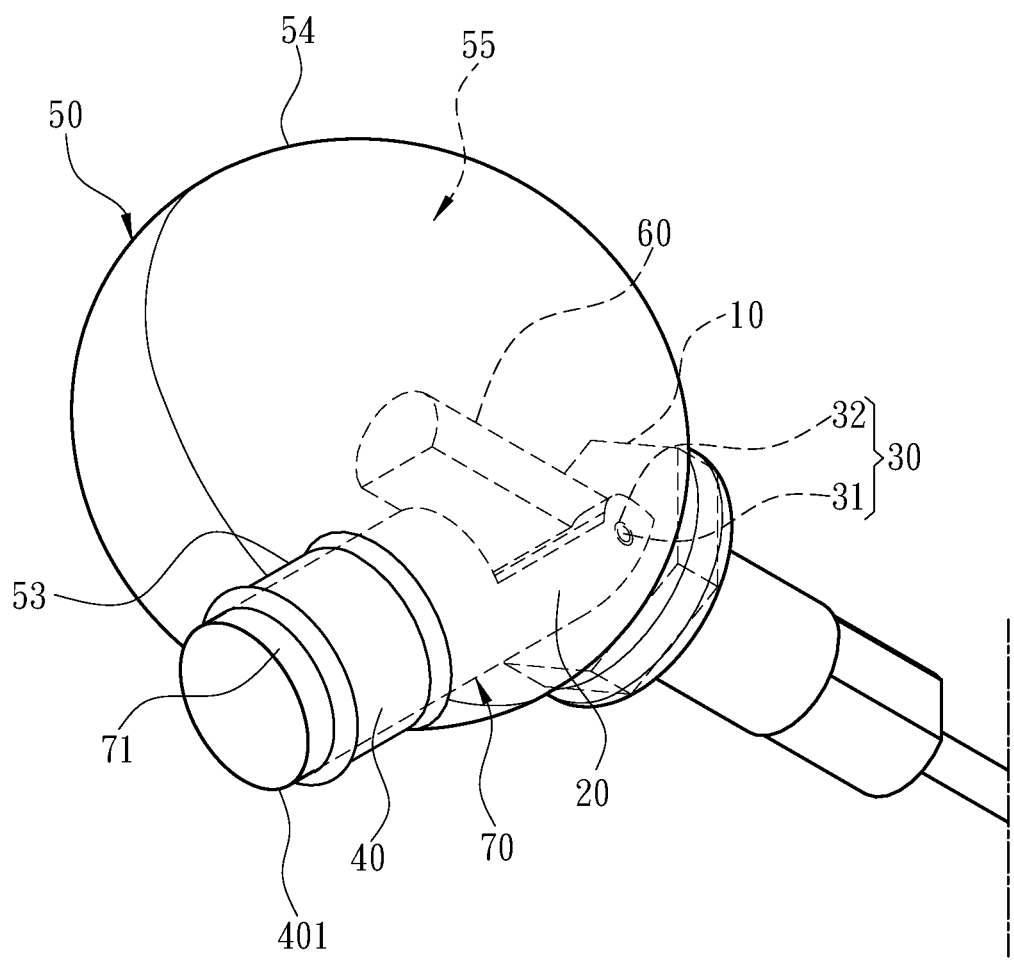
FIG. 1 is a structural schematic diagram of a liquid level detection device in an embodiment of the present invention.
Figure 2:
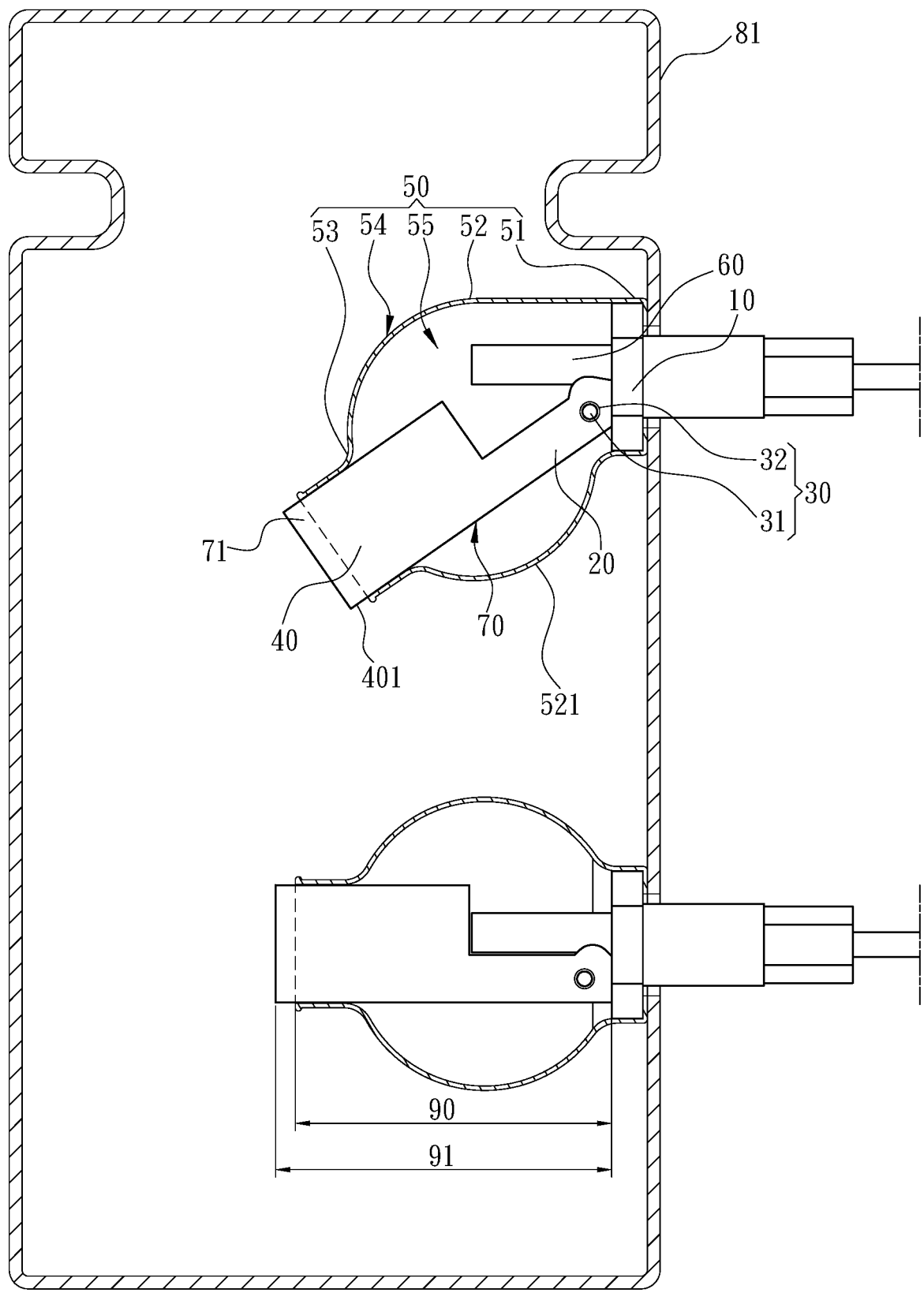
FIG. 2 is a side sectional view of a liquid level detection device in an embodiment of the present invention.

By referring to FIGS. 1 and 2, the present invention provides a liquid level detection device 100. The liquid level detection device 100 is disposed in a container 81 comprising a viscous liquid 80. The viscous liquid 80 may be a liquid soap or a hand cleanser. Further, the liquid level detection device 100 includes an installing seat 10 disposed on the container 81, a connecting rod 20, a pivoting structure 30 connected with the installing seat 10 and one end of the connecting rod 20, and a floating element 40 disposed at one end of the connecting rod 20 opposite to the installing seat 10. Namely, the connecting rod 20 is fixed on the installing seat 10 by the pivoting structure 30, while the floating element 40 swings together with the connecting rod 20 by connecting with the connecting rod 20, wherein the connecting rod 20 and the floating element 40 may be respectively formed integrally or may be assembled mutually.

Based on this, in an embodiment, the liquid level detection device 100 is a duck-billed water level switch. Further, the liquid level detection device 100 comprises a limiting rod 60 connected with the installing seat 10 and configured to limit the degree that the connecting rod 20 swings upwards. The limiting rod 60 and the connecting rod 20 jointly form a duck-billed structure. Meanwhile, the limiting rod 60 may be a member assembled to the installing seat 10 or extension from the installing seat 10 to form integrally. In an embodiment, the pivoting structure 30 includes at least one convex block 31 disposed on the limiting rod 60, and an assembly hole 32 disposed in the connecting rod 20 to correspond to the convex block 31. After the assembly hole 32 and the convex block 31 are assembled, the limiting rod 60 and the connecting rod 20 generate a pivoting relationship. Moreover, the convex block 31 and the assembly hole 32 are not limited to be implemented in the previous solution. In an embodiment, the assembly hole 32 may be disposed on the limiting rod 60, while the convex block 31 is disposed on the connecting rod 20.

Figure 3:
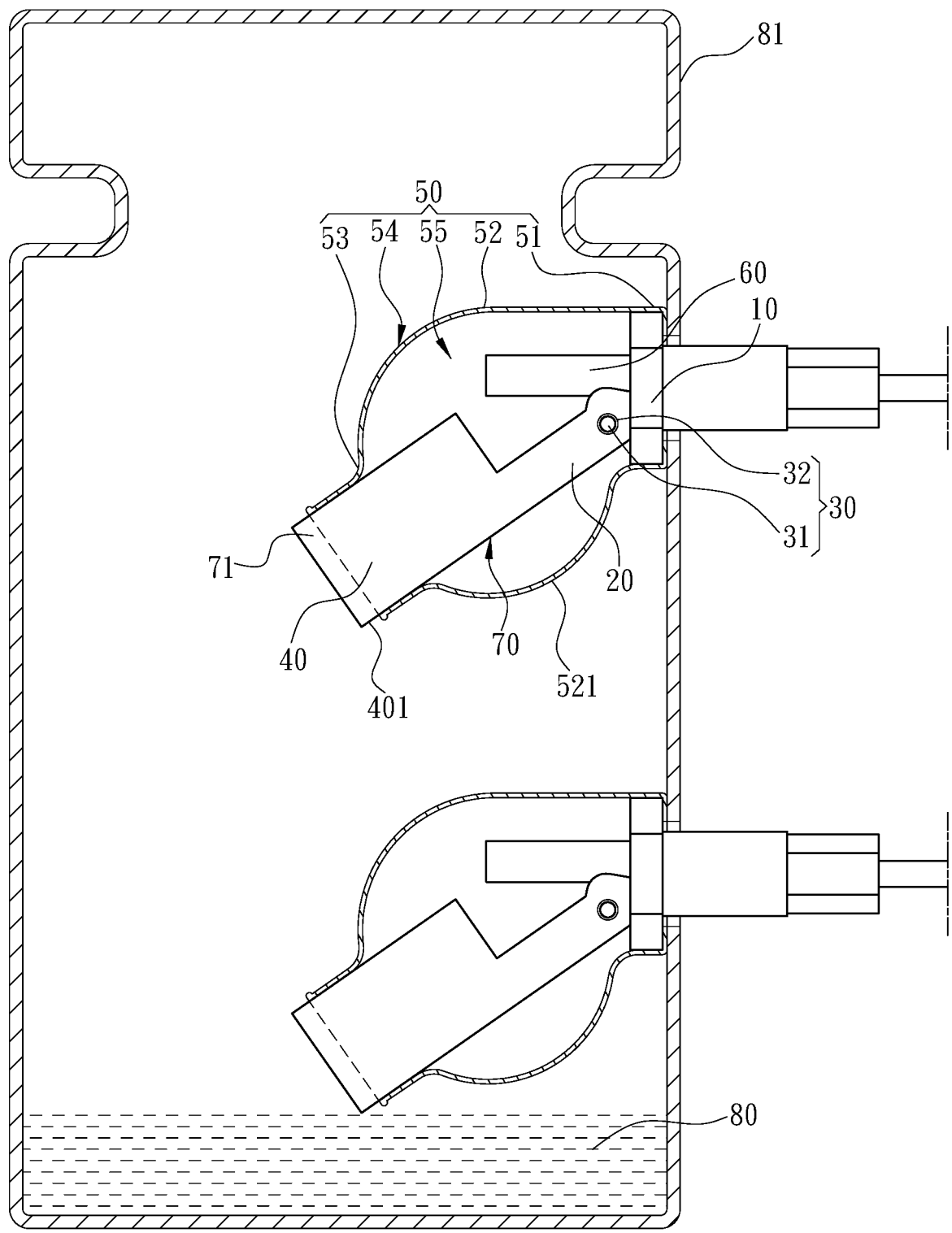
FIG. 3 is an implementation diagram (I) of a liquid level detection device in an embodiment of the present invention.
Figure 4:
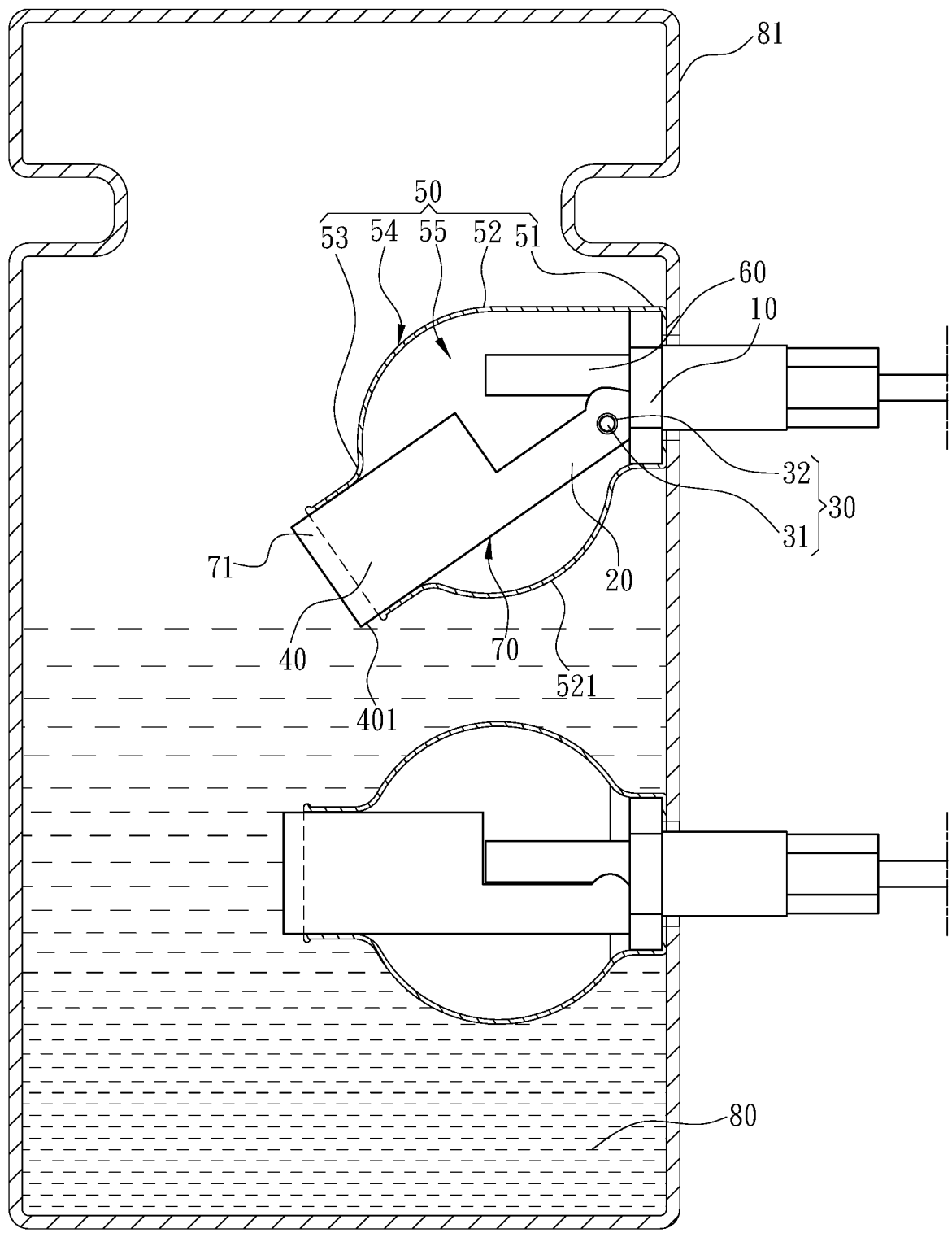
FIG. 4 is an implementation diagram (II) of a liquid level detection device in an embodiment of the present invention.

In another aspect, the liquid level detection device 100 comprises two states according to whether an electric signal is generated or not. The first state is a conducting state, and the second state is a closure state. The conducting state of the liquid level detection device 100 means that the height of the liquid level of the viscous liquid 80 is enough to enable the floating element 40 to drive the connecting rod 20 to trigger an electric signal trigger point (not shown in the figure) on the installing seat 10, and the pattern of the liquid level detection device 100 entering the conducting state is shown in FIG. 4. In another aspect, the closure state of the liquid level detection device 100 means that the height of the liquid level of the viscous liquid 80 is not enough to enable the floating element 40 to drive the connecting rod 20 to trigger the electric signal trigger point, and the pattern of the liquid level detection device 100 entering the closure state is shown in FIG. 3.

Figure 5:
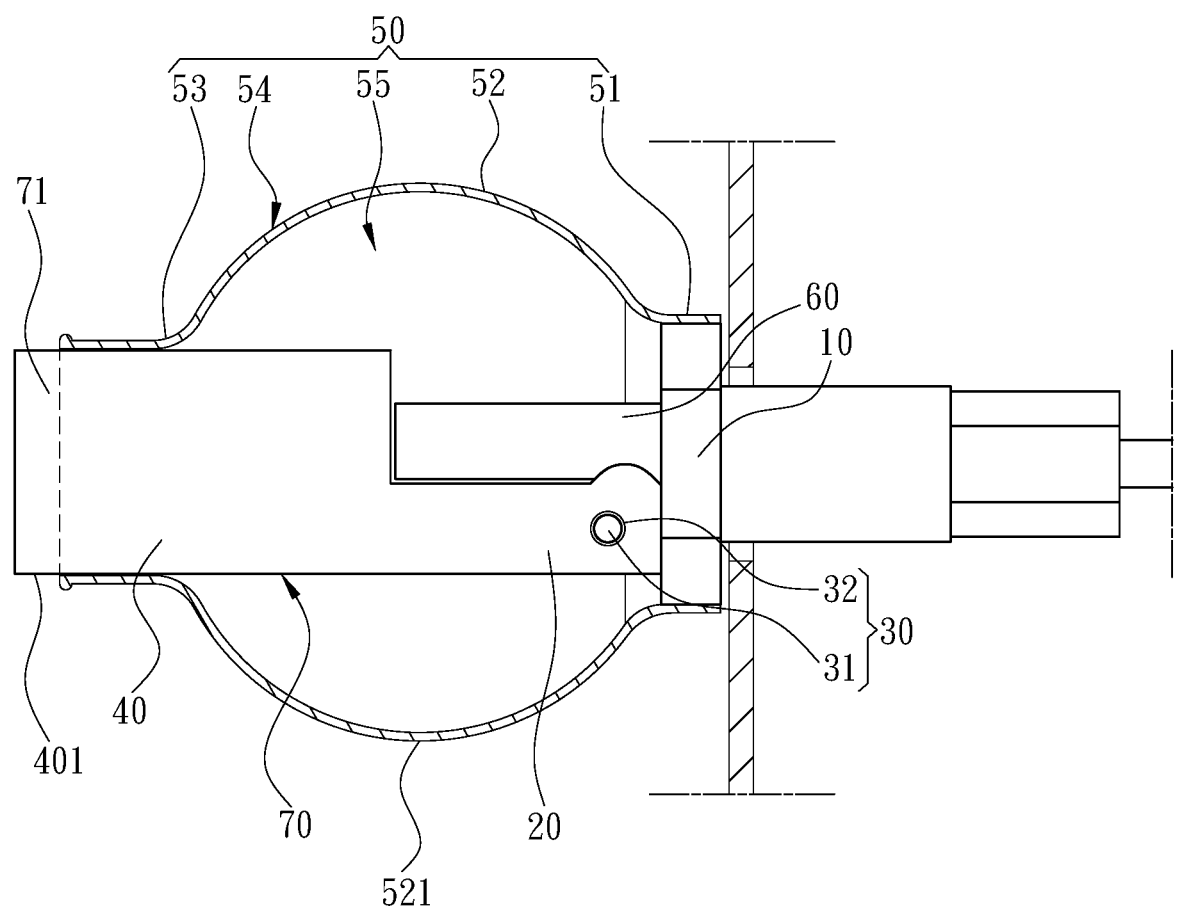
FIG. 5 is a side sectional view of a liquid level detection device in another embodiment of the present invention.

By referring to FIGS. 1 and 2, in order to prevent the viscous liquid 80 from contacting with the pivoting structure 30, the liquid level detection device 100 of the present invention includes a protecting bladder 50 disposed to correspond to the pivoting structure 30. The protecting bladder 50 may be spherical and flexible, and may be composed of a plurality of bladder slices 54 or formed integrally. Further, the protecting bladder 50 is integrally provided with a connecting portion 51, a coating portion 52 extending from the connecting portion 51, and a liquid intake limiting portion 53 connected with the coating portion 52. Specifically, in an embodiment, the connecting portion 51 is sleeved on the installing seat 10, and is simultaneously clamped by the installing seat 10 and the container 81. In another embodiment, the connecting portion 51 may be designed to comprise a necking structure which is only sleeved on the installing seat 10, as shown in FIG. 5. Based on this, the coating portion 52 is a relatively expanded part of the protecting bladder 50. The expansion of the coating portion 52 shall be in such a degree of not affecting the swing of the connecting rod 20 relative to the installing seat 10. However, a maximum expansion position 521 of the coating portion 52 shall be higher than a lowest point 401 of the floating element 40 in the closure state. Namely, an expansion diameter 90 of the coating portion 52 shall be less than a total length 91 of the connecting rod 20 and the floating element 40. Moreover, the coating portion 52 defines an accommodating space 55 in which the liquid level detection device 100 is partially disposed therein. Furthermore, the structure of the liquid intake limiting portion 53 may be the same as the structure of the connecting portion 51. The liquid intake limiting portion 53 may be a necking structure on the protecting bladder 50. A protecting layer is formed by the necking structure of the floating element 40 or the connecting rod 20 to prevent the viscous liquid 80 from entering. Based on this, although the liquid intake limiting portion 53 of the present invention is disposed to correspond to the floating element 40, the liquid intake limiting portion 53 may be disposed on the connecting rod 20 according to implementation demands in another embodiment.

By referring to FIGS. 1 and 2, as described above, the protecting bladder 50 of the present invention does not completely wrap the liquid level detection device 100 so that the liquid level detection device 100 is divided into a coated part 70 and an exposed part 71. Specifically, the protecting bladder 50 of the present invention not only at least wraps the pivoting structure 30, but also coats the installing seat 10 and the floating element 40 according to the implementation demands. A part of the liquid level detection device 100 coated by the protecting bladder 50 is the coated part 70, and the rest is the exposed part 71. Further, the protecting bladder 50 of the present invention does not coat an end of the floating element 40 opposite to the connecting rod 20, where the end is the lowest point 401 of the floating element 40 in the closure state. Therefore, when the floating element 40 is implemented, the structure of the floating element 40 directly contacts with the viscous liquid 80, so as to specifically perceive the buoyancy provided by the viscous liquid 80.

What is claimed is:

1. A liquid level detection device, disposed in a container comprising a viscous liquid, wherein the liquid level detection device comprises:
    an installing seat disposed on the container;
    a connecting rod;
    a pivoting structure connected with the installing seat and one end of the connecting rod; and
    a floating element disposed at one end of the connecting rod opposite to the installing seat,
    wherein the liquid level detection device comprising a protecting bladder disposed to correspond to the pivoting structure; the protecting bladder connects to a side surface of the floating element to divide the liquid level detection device into a coated part and an exposed part; one end of the floating element opposite to the installing seat is the exposed part, an other end of the floating element and part of the floating element arranged in the protecting bladder together with the pivoting structure belong to the coated part, and the protecting bladder isolates the viscous liquid from contacting with the pivoting structure.

2. The liquid level detection device of claim 1, wherein the protecting bladder comprises a connecting portion clamped by the installing seat and the container, a coating portion extending from the connecting portion and at least parts of the coating portion coating the pivoting structure, and a liquid intake limiting portion connected with the coating portion and fitting to the floating element.

3. The liquid level detection device of claim 2, wherein the protecting bladder is flexible.

4. The liquid level detection device of claim 2, wherein the protecting bladder is composed of a plurality of bladder slices.

5. The liquid level detection device of claim 1, wherein the protecting bladder comprises a connecting portion sleeved on the installing seat, a coating portion extending from the connecting portion and at least parts of the coating portion coating the pivoting structure, and a liquid intake limiting portion connected with the coating portion and fitting to the floating element.

6. The liquid level detection device of claim 5, wherein the protecting bladder is flexible.

7. The liquid level detection device of claim 5, wherein the protecting bladder is formed by combining a plurality of bladder slices.

8. The liquid level detection device of claim 2, wherein the pivoting structure comprises at least one convex block disposed on a limiting rod, and an assembly hole disposed on the connecting rod to correspond to the convex block.

9. The liquid level detection device of claim 5, wherein the pivoting structure comprises at least one convex block disposed on a limiting rod, and an assembly hole disposed on the connecting rod to correspond to the convex block.

\* \* \* \* \*